United States Patent [19]

Love et al.

[11] Patent Number: 5,178,402
[45] Date of Patent: Jan. 12, 1993

[54] LEVELING ASSEMBLY FOR A VEHICLE

[75] Inventors: Mahlon L. Love, Geneseo; Gary D. Luxon, Moline, both of Ill.

[73] Assignee: Deere & Company, Moline, Ill.

[21] Appl. No.: 741,849

[22] Filed: Aug. 7, 1991

[51] Int. Cl.[5] ............................ B60S 9/00; B62D 37/00
[52] U.S. Cl. ....................................... 280/6.12; 180/41;
200/DIG. 1
[58] Field of Search ...................... 280/840, 6.11, 6.12,
280/DIG. 1, 714; 180/41

[56] References Cited

U.S. PATENT DOCUMENTS

| | | | |
|---|---|---|---|
| 2,742,298 | 4/1956 | Witzel | 280/6.11 |
| 2,988,378 | 6/1961 | Davies | 280/6.12 |
| 3,703,298 | 11/1972 | Laverda . | |
| 3,712,635 | 1/1973 | Weakly . | |
| 3,731,470 | 5/1973 | Cornish et al. . | |
| 4,050,704 | 9/1977 | Duca et al. . | |
| 4,750,751 | 6/1988 | Schafer . | |
| 4,776,153 | 10/1988 | DePauw et al. . | |

FOREIGN PATENT DOCUMENTS 3922260 1/1991 Fed. Rep. of Germany .

OTHER PUBLICATIONS

LaVerda, Mietitrebbia Autolivellante M100AL, 9 Oct. 1972, Breganze, Italy, brochure.
Sun Circuit Savers, brochure, p. 8.25.
"The Grain Harvesters"; Graeme Quick and Wesley Buchele; pp. 197-205.

Primary Examiner—Kenneth R. Rice

[57] ABSTRACT

A leveling system for a combine having a transaxle. The leveling system comprises a three point linkage coupling the transaxle to the supporting structure of the combine. The first and second links of the three point linkage are coupled to the underside of the transaxle. The third link is coupled to the top of the transaxle. A transverse sway bar is positioned between the supporting structure and the transaxle. Two hydraulic cylinders are mounted between the first and second links and the supporting structure for manipulating the angle of inclination of the transaxle relative to the supporting structure.

6 Claims, 5 Drawing Sheets ent to the first and second links and the open side of the cylinder is mounted to the subframe. The hydraulic pump directs pressurized hydraulic fluid through a supply line to the control valve. The control valve then selectively directs the pressurized hydraulic fluid from the pump through first and second supply/return lines that are coupled to the piston rod side of the hydraulic cylinders. A crossover line extends between the open side of the two hydraulic cylinders. The control valve is a three-position four-way solenoid actuated valve that is manipulated by an electrical controller having an inclinometer. Each of the hydraulic cylinders is provided with a hydraulic flow fuze located between the crossover line and the open side of the cylinder which prevents the flow of fluid out of the cylinder when hydraulic fluid flow exceeds the fuze's settings.

LEVELING ASSEMBLY FOR A VEHICLE

BACKGROUND OF THE INVENTION

1. Field of the Invention

The invention is directed to a simplified assembly for leveling a transaxle driven vehicle, such as a combine, by adjusting the angle of the transaxle relative to the supporting structure of the vehicle.

2. Description of the Prior Art

An agricultural combine harvests a crop, threshes the crop, separates the grain and chaff from straw, and cleans the crop to remove the chaff from the grain. For the most part combines work most efficiently when they are operated in a level configuration. To this end various self-leveling or hillside combines have been developed. These combines maintain the supporting structure of the combine level even in relative hilly conditions. Such combines are also provided with means for changing the angular position of the harvesting assembly relative to the supporting structure so that the harvesting assembly can track the contour of the ground.

Some examples of self-leveling or hillside combines are disclosed in U.S. Pat. Nos. 3,703,298, 3,712,635, 3,731,470 and 4,050,704. Typically hydraulic cylinders manipulate the position of the supporting wheels relative to the supporting structure. The control valve controlling the flow of hydraulic fluid to the hydraulic cylinders maybe solenoid actuated and manipulated by an electrical controller having an inclinometer, such as disclosed in U.S. Pat. Nos. 3,703,298 and 4,050,704 identified above.

SUMMARY

It is an object of the present invention to provide a simple leveling system for a transaxle driven combine.

It is another object of the present invention to provide a leveling system that does not unduly increase the transverse width of the combine.

It is a feature of the present invention that the transaxle is coupled to the supporting structure of the combine by a three point linkage.

The leveling system of the present invention comprises a subframe that is welded to the supporting structure so as to form part of the supporting structure. The subframe is provided with first and second mounting locations having ball pivot sockets for receiving first and second forwardly extending links. The transaxle is provided with downwardly extending first and second ball pivot sockets to which are coupled first and second links. The subframe is provided with a third mounting location having a ball socket to which is secured a third forwardly extending link. The transaxle is provided with a third upwardly extending ball socket to which is coupled the third link. The subframe is provided with a fourth mounting location having a ball socket to which is mounted a transverse sway bar. The transaxle is provided with a fourth mounting location having a ball socket to which the other end of the sway bar is mounted.

Two hydraulic cylinders extend downwardly from the subframe to the first and second links. The combine is provided with a hydraulic pump having a flow control valve for selectively directing pressurized hydraulic fluid to and from the hydraulic cylinders. Each hydraulic cylinder is provided with a cylinder and a piston having a piston rod that extends outwardly from the

DETAILED DESCRIPTION

Figure 1:
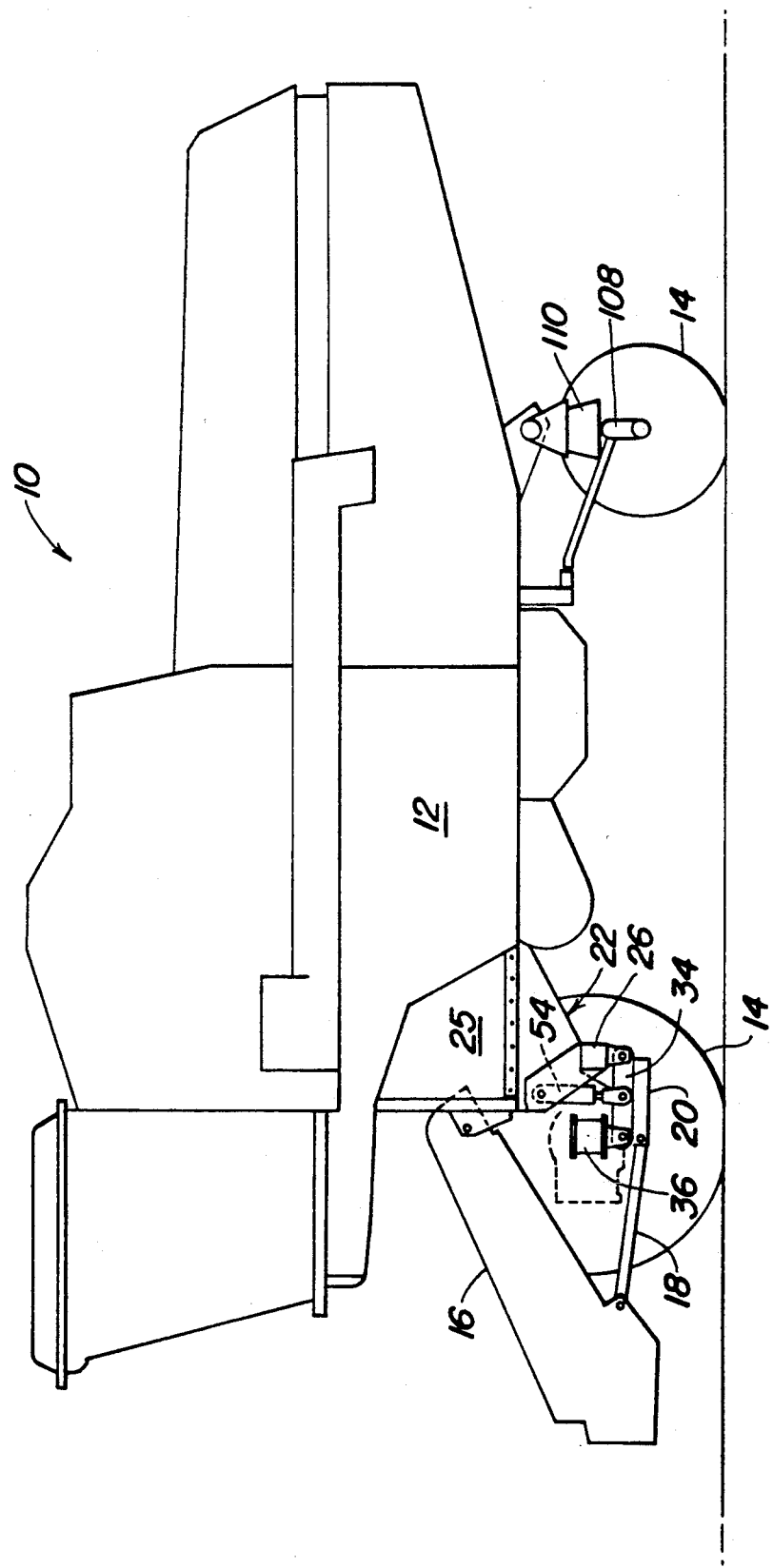
FIG. 1 is a partial side view of a combine having the leveling assembly of the present invention.
Figure 2:
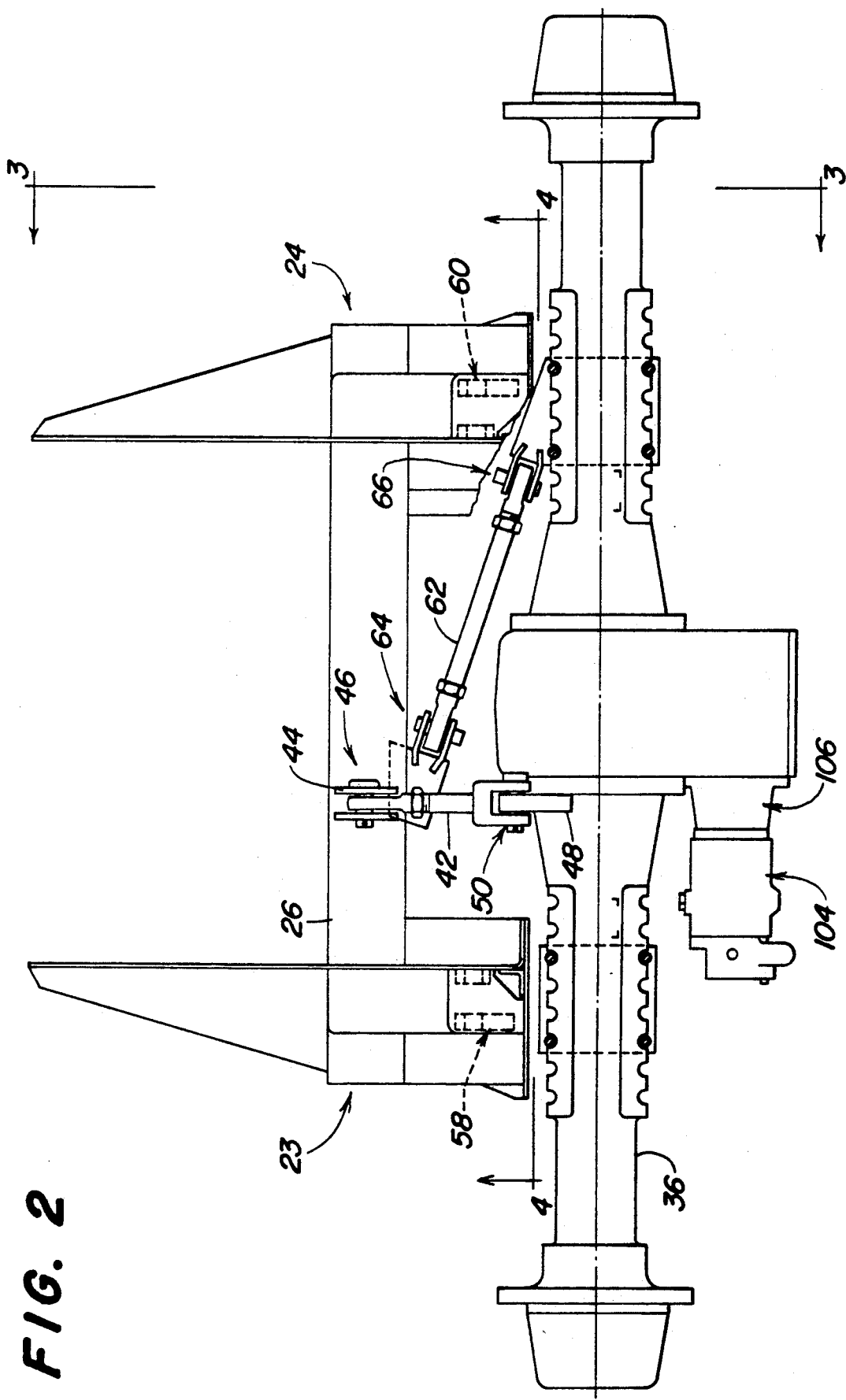
FIG. 2 is a top view of the leveling assembly.
Figure 3:
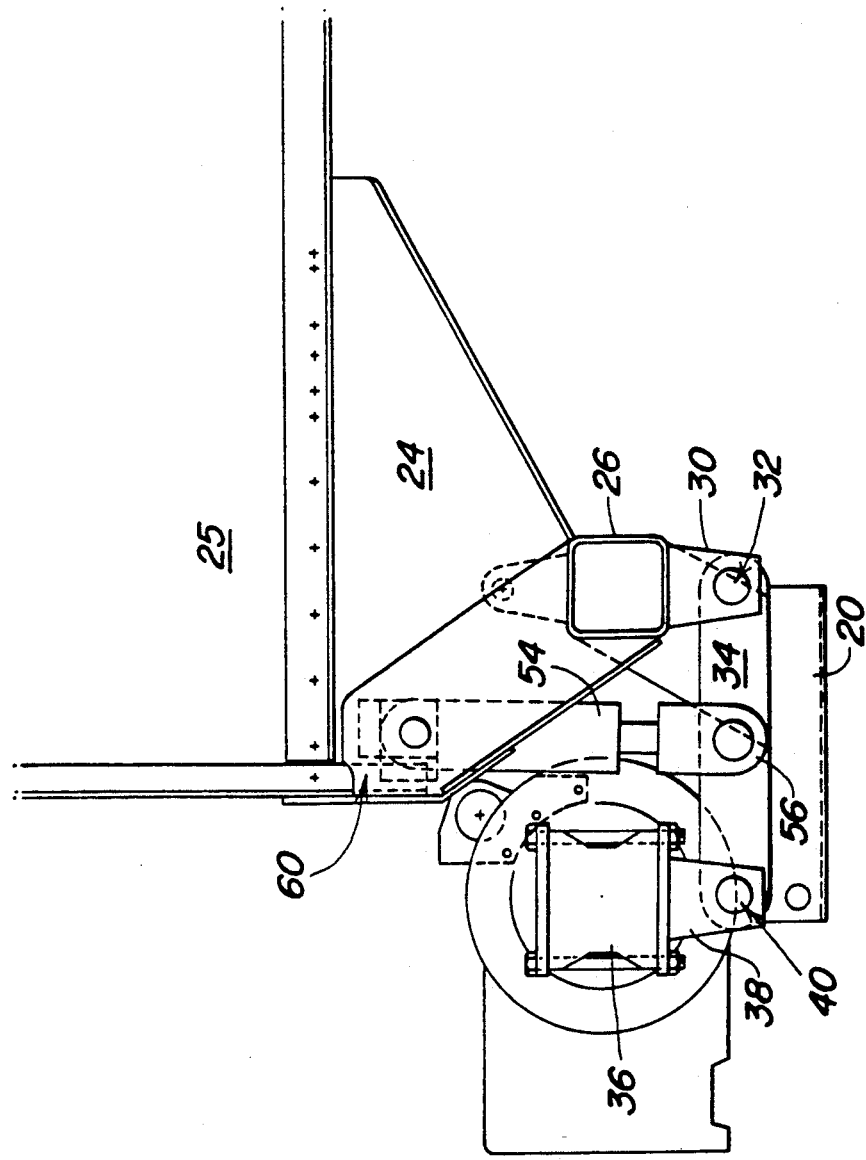
FIG. 3 is a side view of the leveling assembly.
Figure 4:
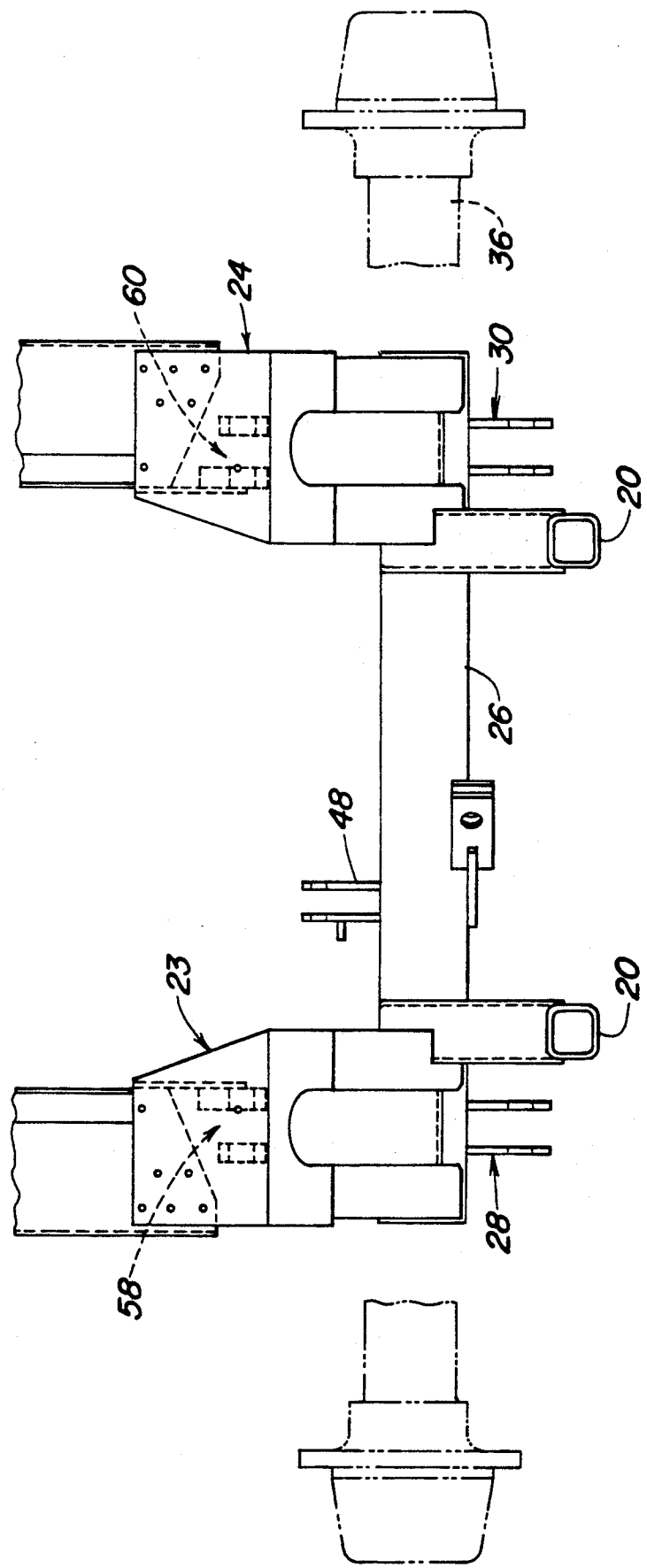
FIG. 4 is a front view of the leveling assembly.

FIG. 1 shows a combine 10 having a supporting structure 12 that is supported above the ground by wheels 14. The supporting structure houses a threshing means for threshing a harvested crop, a separator means for separating grain and chaff from straw and a cleaning means for removing the chaff from the grain. The combine may use conventional or nonconventional threshing, separating and cleaning systems.

Extending forwardly from the supporting structure is a feederhouse 16 to which maybe coupled a harvesting platform (not shown). The feederhouse 16 and the harvesting platform coupled thereto are raised and lowered by feederhouse lift cylinder 18 which is coupled to the supporting structure by tubular channel 20. The harvesting platform harvests the crop and directs the harvested crop into the feederhouse which conveys the harvested crop to the threshing means. The harvesting platform is pivotable about an axial axis and may be similar to the type disclosed in U.S. Pat. No. 4,776,153 which is incorporated herein by reference.

A subframe 22 is welded to the underside of the combine to form part of the supporting structure. The subframe comprises first and second mounting brackets 23 and 24 that are welded to sidesheets 25 of the supporting structure. A rectangular hollow tube 26 is welded to the brackets and extends transversely across the combine. Extending downwardly from the tube are first and second mounting brackets 28 and 30 each having a ball joint 32.

First and second forwardly extending links 34 are coupled to the first and second mounting brackets 23 and 24, respectively, by ball joints 32. The first and second links 34 are identical and extend axially forward in a parallel configuration, only the second link located on the left side of the combine is shown. Forward transverse axle 36 is positioned above first and second links 34 and is coupled to links 34 by first and second mounting brackets 38 that extend downwardly from the axle, only the second mounting bracket located on the left side of the combine is shown. Each mounting bracket is provided with a ball joint 40 which is similar or identical to ball joint 32 of the subframe.

A third link 42 is mounted to the top of hollow tube 26 at mounting bracket 44 by ball joint 46. This link extends axially forward and is mounted to the top of the axle by mounting lug 48. As with mounting bracket 44, mounting lug 48 is provided with a ball joint 50 for coupling the third link to the axle.

First and second hydraulic cylinders 52 and 54 are located between the first and second links 34 and the first and second brackets 22 and 23 of the subframe. The cylinders are mounted at first and second bottom mounting points 56 to the first and second links and at first and second top mounting points 58 and 60 to the first and second brackets. These cylinders are used to manipulate the inclination of the axle relative to the supporting structure to maintain the supporting structure in a level configuration.

A sway bar 62 is transversely mounted between the tube of the subframe and the axle. The sway bar is mounted to ball joint 64 on the subframe and ball joint 66 on the axle.

Figure 5:
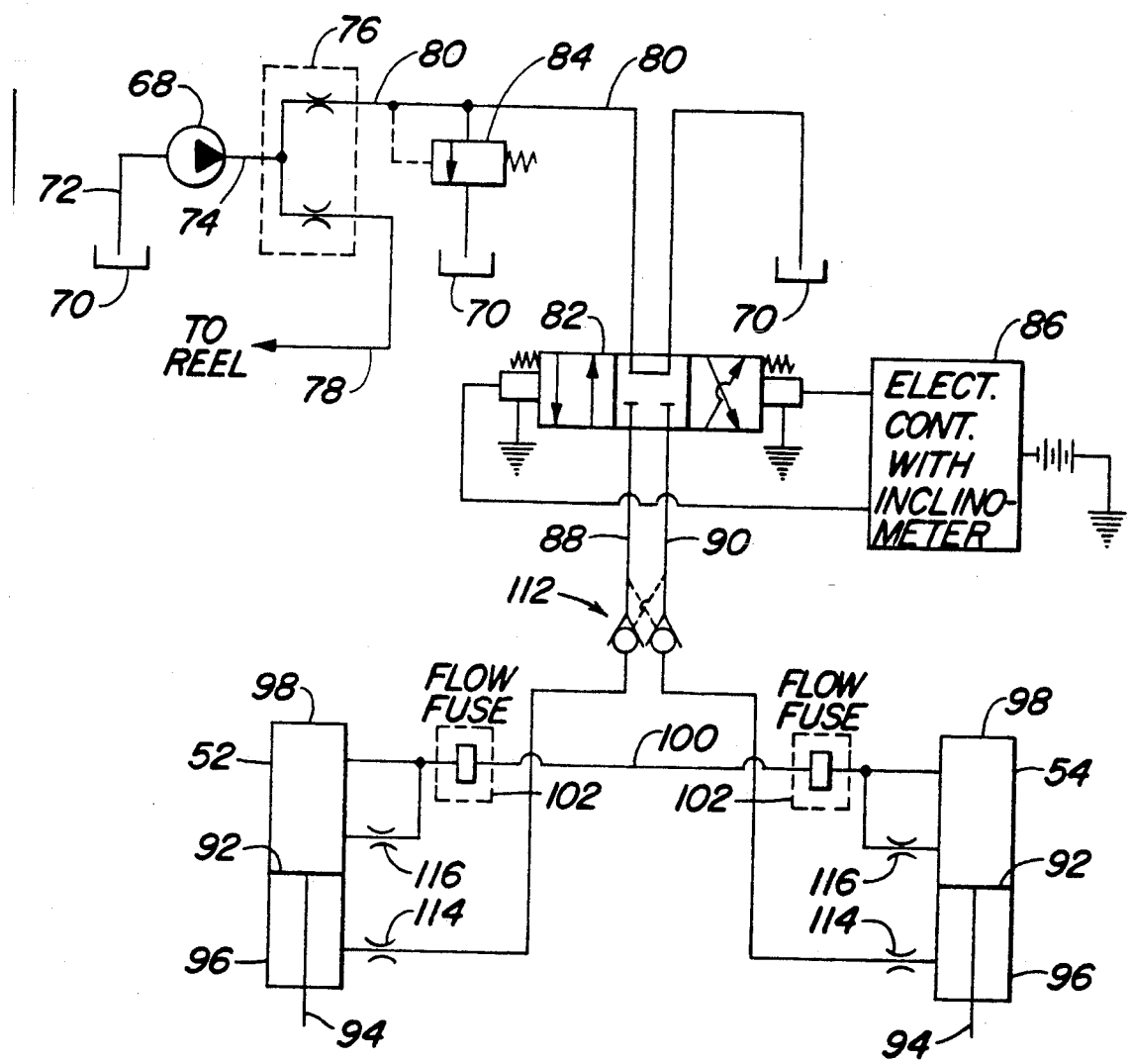
FIG. 5 is a hydraulic schematic for operating the hydraulic cylinders of the leveling assembly.

FIG. 5 is the hydraulic schematic for manipulating the hydraulic cylinders. Hydraulic pump 68 draws oil from sump 70 through supply line 72. Hydraulic pump 68 also supplies pressurized hydraulic fluid to the reel of the harvesting platform. Pressurized fluid from pump 68 is directed through supply line 74 to flow divider 76. Flow divider 76 directs the fluid between reel supply line 78 and leveling supply line 80.

Supply line 80 directs pressurized hydraulic fluid to a four-way three-position solenoid actuated control valve 82 which regulates the flow of pressurized hydraulic fluid to the hydraulic cylinders. Leveling supply line 80 is provided with a pressure relief valve 84 for directing fluid back to sump. An electrical controller 86 having an inclinometer automatically manipulates control valve 82 to maintain the supporting structure in a level configuration. Pressurized fluid is directed from the control valve to the first and second cylinders through first and second supply/return lines 88 and 90. The supply/return lines direct the pressurized fluid to the piston rod side of the cylinders. Each cylinder is provided with a piston 92 and a piston rod 94. The piston divides the cylinder into the piston rod side 96 and an open side 98. A crossover line 100 extends between the open side of the hydraulic cylinders so that fluid can be freely transferred from the open side of one cylinder to the open side of the other cylinder.

Hydraulic flow fuzes 102 are positioned between the crossover line and the open side of the cylinders. The hydraulic flow fuze can be of the type marketed by SUN HYDRAULICS of Sarasota, Fla. Flow fuzes of this type allow fluid to flow between the hydraulic cylinders at normal flows, but closes and shuts off all flow if a line breaks and the flow between the hydraulic cylinders exceeds the setting of the fuze.

Supply/return lines 88 and 90 are provided with a double pilot operated check valve assembly 112. Restrictions 114 in supply/return lines 88 and 90 create back pressure in the check valve assembly opening the check valve on the line through which fluid is exhausted. The cylinders are also provided with a rephasing port 116 which charges cross over line 100 and the open side 98 of the opposite cylinder.

The front axle is a transaxle having a hydraulic motor 104 and a transmission 106. The structure of the transaxle is best disclosed in U.S. patent application Ser. No. 525,367, filed May 17, 1990, which is incorporated herein by reference and is assigned to the assignee of the present application.

By incorporating this leveling structure into a combine the front axle is lowered to accommodate the assembly. As such the rear axle 108 must be lowered a similar amount to level the combine fore and aft. A spacing bracket 110 is mounted to the rear axle effectively lowering this axle a like amount with the front axle.

The present invention provides a simplified self-leveling assembly for a combine. As such the invention should not be limited to the above-described embodiment, but should be limited solely to the claims that follow.

We claim:

1. An agricultural combine for harvesting, threshing and separating an agricultural crop, the combine comprising:
   a supporting structure;
   a first link pivotally coupled to the supporting structure;
   a second link pivotally coupled to the supporting structure, the first and second links are parallel to one another and extend forwardly from where they are mounted to the supporting structure;
   a third link pivotally coupled to the supporting structure, the third link extends forwardly from where it is mounted to the supporting structure;
   a transverse forward axle is pivotally coupled to the first, second and third links, the axle is provided with two wheels, the axle is located above the first and second links and below the third link, the axle is a transaxle having a hydraulic motor and a transmission for driving the wheels mounted to the axle;
   two hydraulic cylinders extend between the supporting structure and the first and second links for adjusting the inclination of the axle relative to the supporting structure;
   a sway bar pivotally coupled to the supporting structure and the axle, the sway bar extends transversely between the supporting structure and the axle; and
   a hydraulic pump and a flow control valve for selectively directing pressurized hydraulic fluid to and from the hydraulic cylinders, each hydraulic cylinder is provided with a cylinder and a piston having a piston rod that extends outwardly from the cylinder, the cylinder is divided by the piston into a piston rod side and an open side, the hydraulic pump directs pressurized hydraulic fluid through a supply line to the control valve, the control valve then selectively directs the pressurized hydraulic fluid from the pump through a first and second supply/return lines that are coupled to the piston rod side of the hydraulic cylinders, a crossover line extends between the open side of the two hydraulic cylinders.

2. A combine as defined by claim 1 wherein the control valve is a three-position four-way solenoid actuated valve, the valve is actuated by an electrical controller having an inclinometer.

3. A combine as defined by claim 2 wherein each of the hydraulic cylinders is provided with a hydraulic flow fuze located between the crossover line and the open side of the cylinder to stop the flow of hydraulic fluid from the hydraulic cylinder when the flow exceeds the setting of the fuze.

4. An agricultural combine for harvesting, threshing and separating an agricultural crop, the combine comprising:
   a supporting structure;
   a transverse forward axle is provided with two wheels;
   a self-leveling assembly adjustably couples the axle to the supporting structure, the self leveling assembly is provided with two hydraulic cylinders for manipulating the axle relative to the supporting structure;
   a hydraulic pump and a flow control valve mounted to the supporting structure for selectively directing pressurized hydraulic fluid to and from the hydraulic cylinders, each of the hydraulic cylinders is provided with a cylinder and a piston having a piston rod that extends outwardly from the cylinder, the cylinder is divided by the piston into a piston rod side and an open side, the hydraulic pump directs pressurized hydraulic fluid through a supply line to the control valve, the control valve then selectively directs the pressurized hydraulic fluid from the pump through a first and second supply/return lines that are coupled to the piston rod side of the hydraulic cylinders; and
   a crossover line extends between the open side of the two hydraulic cylinders.

5. A combine as defined by claim 4 wherein each of the hydraulic cylinders is provided with a hydraulic flow fuze located between the crossover line and the open side of the cylinder to stop the flow of hydraulic fluid from the hydraulic cylinder when the flow exceeds the setting of the fuze.

6. A combine as defined by claim 5 wherein the control valve is a three-position four-way solenoid actuated valve, the valve is actuated by an electrical controller having an inclinometer.

* * * * *